March 26, 1935.   A. J. DENISTON, JR   1,995,705
NAIL
Filed April 21, 1933
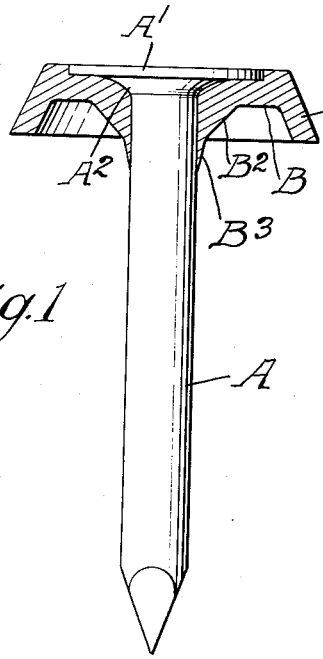
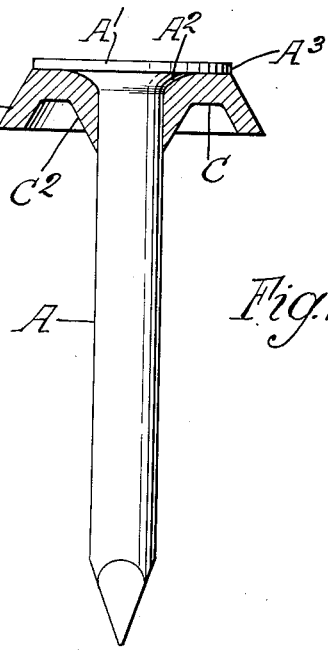
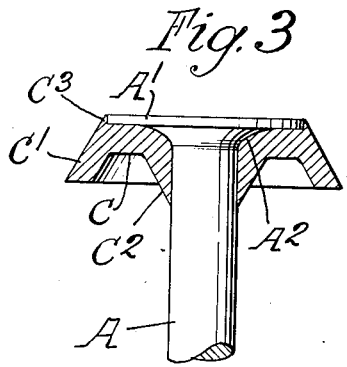
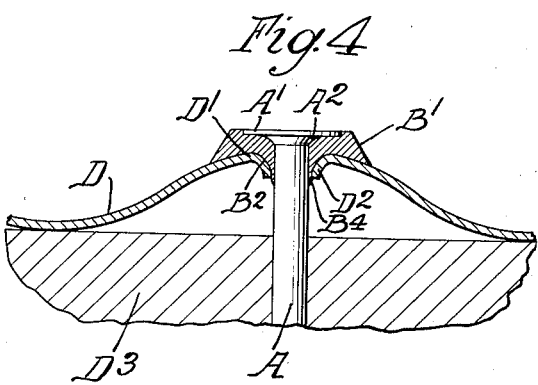
Inventor
Albert J. Deniston Jr
by Parker & Carter.
Attorneys Patented Mar. 26, 1935

1,995,705

UNITED STATES PATENT OFFICE 1,995,705

NAIL

Albert J. Deniston, Jr., Chicago, Ill.

Application April 21, 1933, Serial No. 667,172

3 Claims. (Cl. 85—28)

This invention relates to the construction of roofs and walls and to a means for fastening roofing or wall members, and covering and sheathing members in particular, in place.

It has for one object to provide a roof covering formed of sheets of material, corrugated or otherwise shaped, and held in place upon purlins or other members by means of fastening nails which penetrate the roofing and enter the structural member.

Another object is to provide in connection with a fastener a sealing means so that the hole formed by the fastener is sealed and made water tight. Another object is to provide means in connection with the fastener for protecting the area about the hole to prevent infiltration of water, and, if the roofing or other member is of metal, to prevent rusting or corrosion in the area about the hole.

Other objects will appear from time to time in the specification and claims.

In one form shown, the structure is formed of a purlin or other structural member to which corrugated metallic sheathing is applied. This may, of course, be for a wall or a roof or any other enclosing or partitioning member. Such structures have one common use, as roofs and for exterior walls, and the necessity of preventing leakage through the hole made by the fastener and for preventing rust or other corrosion of the metal sheathing member is important.

In the arrangement shown, the nail, or other fastener, which may itself be of almost any suitable form, is provided with a driving head and with a sealing head, the two preferably joined together so that they have the appearance of, and are, in effect, a single head. The driving head is preferably made integral with the body of the nail and the sealing head is of a softer material and is positioned about the shank of the nail and about and preferably largely beneath the driving head of the nail. The sealing head may be of such shape that when the nail is driven and it comes in contact with the metallic or other sheathing material, a portion of the sealing head penetrates into the hole through the sheathing and seals it at that point and another portion of the sealing head contacts the sheathing and makes a sealing contact with it to protect an area about the hole which is considerably greater than the area of the hole so that there are thus made two seals, an inner seal at and within the hole, and an outer seal away from the hole. In some forms these two seals will be separate and there will be an unsealed, annular space between them. In other forms they will not be separate and substantially the entire area of the head of the nail will be sealed in contact with the sheathing.

My invention is illustrated more or less diagrammatically in the accompanying drawing, wherein:

Figure 1 is a longitudinal section of a nail, showing one form of my sealing head;

Figure 2 is a similar view, showing a modified form;

Figure 3 is a similar view, showing a further modification;

Figure 4 is a sectional view through the sheathing and structural member, showing a nail in place.

Like parts are designated by like characters throughout the specification and drawing.

A indicates the shank of a nail. $A^1$ is the driving head of the nail. The two are preferably made integral and at the point where they join there may be a curved or flattened fillet $A^2$. The sealing head, which may be of lead and should be of some material softer than that of the nail, is positioned about the shank and largely beneath the head of the nail and may or may not be positioned so that the nail head protrudes or extends above it as at $A^3$ in Figure 2.

The lead head is formed of a generally flat portion B lying beneath the nail head. At or near its outer edge it has a downwardly depending flared skirt $B^1$. Towards its center it is provided with an inclined, downwardly extending portion $B^2$ which joins a narrow and relatively thin portion $B^3$ which merges with the shank of the nail.

In Figure 2 the nail itself is preferably the same in form as the nail shown in Figure 1. The lead or sealing head which has a depending and outwardly flared skirt like that shown in Figure 1, may be made so that the area of the lead head is no greater than the area of the driving head and thus the driving head extends across the entire top of the composite nail. This construction is shown in Figure 2, in which the sealing head is formed with a generally flat portion C, a downwardly depending and outwardly flared skirt portion $C^1$ and a downwardly depending tapered portion $C^2$ which lies against the shank A.

Figure 3 shows a slight further modification in which the sealing head is essentially the same as that shown in Figure 2, except that the skirt portion $C^1$ is raised along its outer edge so that it covers the edge of the driving head as at $C^3$.

In Figure 4 the nail of Figure 1 is shown in position and when so driven into position, in ordinary practice, the upper surface of the lead head and the driving head may be substantially the same in any of the forms shown. As shown, a portion of the sheathing D has curled or been forced inwardly about the hole as at D¹ and there has thus been formed a tapered or funnel-like depression D² into which the metal of the portions B² and B³ of the lead head have been forced so that this portion of the lead head fills and seals the perforations through the sheathing. The skirt portion B¹ is shown as resting against and making sealing contact with the sheathing at a point away from the hole so that this area is also covered and sealed. This feature is of particular importance when galvanized sheathing is used because in making the hole or driving the nail the bending of the metal may crack away some of the galvanizing and it is important that this area be protected from rusting and corrosion and this result is accomplished as shown in Figure 4. The nail projecting into the purlin or other structural member D³ holds the sheathing in position. As the nail is driven home, a portion of the lead of the sealing head may flow through the hole in the sheathing and form a relatively small, more or less annular section B⁴ which lies between the shank of the nail and the inwardly bent portions D² of the sheathing.

It will be realized that whereas I have herewith shown and described a practical operative device, nevertheless many changes might be made in the size, shape, number and disposition of parts without departing from the spirit of my invention and I wish, therefore, that my showing be taken as in a sense diagrammatic. In particular, while I have shown a smooth nail, the invention may be applied to a barbed nail, to a twisted nail, to a screw and to a driving screw and in fact it may be applied to almost any form of holding or attaching member, whether the latter is properly to be considered as a nail or a screw or a combination of them, and where in the specification and claims I have used the word "nail" I intend that it shall include in its meaning any and all such attaching or fastening parts.

Although I have shown only three modifications of an outwardly and downwardly flaring skirt portion for the sealing head, it is obvious that a great variety of changes in the shape, inclination, disposition, thickness and other features of this sealing head and its skirt may be made, and that these are within the contemplation of my invention, which is not limited to the three forms shown.

The use and operation of my invention are as follows:

When the roofs, walls or partitions of this invention are to be made, one or more structural members such as the member D³ are put into position and the sheathing is applied to the structure so formed. The sheathing may be of any nature but is generally metallic and usually in the form of galvanized and corrugated sheets. These will be perforated either by the use of some tool or directly by the nail as it is driven. However perforated and wherever the perforations may be located, once they have been formed the nail is driven through until its head comes into sealing contact to seal the perforation, as shown particularly in Figure 4. With the nail in the form shown in Figure 2, where the sealing head is distinctly below the upper level of the nail or driving head, the initial driving blows are struck entirely upon the head of the nail proper and not upon the sealing head and thus there is no danger of deforming or destroying or in any way injuring the sealing head. As the nailing progresses the sealing head comes in contact with the sheathing and flows and is driven into the perforation and comes into contact with the sheathing as shown particularly in Figure 4. As this driving is carried on the entire sealing head may be somewhat changed in shape so that the nail head may be driven more or less down into it. No contact of the hammer with the sealing head which may occur at this stage of the driving is damaging because the sealing head has already come into contact with the upper surface of the sheathing and has been properly spaced and positioned with respect to the perforation so that when the nail is driven finally home, whether or not it may be driven so far as to sink more or less into the softer metal of the sealing head, the latter will not be displaced or broken. Thus by this construction a satisfactory nail is produced and yet the relatively soft and more easily distorted or broken sealing head is protected from the blows of the hammer during the early stages of driving and is only liable to be struck by the hammer during the final driving home when this contact of the hammer with the sealing head cannot damage it.

In the forms of the nail such as those shown in Figures 1 and 3, a portion at least of the sealing head is on a level with the upper surface of the driving head, and some contact of the hammer with the sealing head at this point may occur. Since, however, the nail head proper is at least as high as the sealing head, the nail head proper, or driving head, will receive the major portion of the driving force and the sealing head will not be damaged or displaced.

Depending upon the size of the perforation, the size of the nail and the force with which it is driven home, some of the lead may actually penetrate between the walls of the perforation and the shank of the nail, as shown at B⁴ in Figure 4. The seal of the perforation at this point will be complete, whether or not this occurs, but under some circumstances the lead will be driven or carried into the perforation so that between the walls of the perforation and the shank of the nail there is formed a thin annular body of the sealing material and when this takes place, the perforation is thus sealed from end to end and the nail itself may not be in contact with the walls of the perforation at any point.

I claim:

1. In combination in a nail, a shank and an integral laterally extending driving head, an integral thickened fillet-like portion about the shank and against the head, joining the two, and a sealing head of material softer than the driving head, permanently fixed to the shank, positioned about it and beneath the driving head, the sealing head provided with a downwardly depending, tapered portion in contact with the shank and overlying the fillet-like portion of the shank and head, the sealing head being provided with a downwardly depending, outwardly flaring, peripheral skirt portion, the latter being shorter than the first mentioned downwardly depending portion of the sealing head.

2. In combination in a nail, a shank and an integral laterally extending driving head, an integral thickened fillet-like portion about the shank and against the head, joining the two, and a sealing head of material softer than the driving head, permanently fixed to the shank, positioned about it and beneath the driving head, the sealing head provided with a downwardly depending, tapered portion in contact with the shank, the lower surface of said downwardly depending portion being of approximately the same contour as the under surface of the nail head, the sealing head being provided with a downwardly depending, outwardly flaring, peripheral skirt portion, the latter being shorter than the first mentioned downwardly depending portion of the sealing head.

3. In combination in a nail, a shank, an integral laterally extending driving head, an integral thickened fillet-like portion about the shank and against the head, joining the two, and a sealing head of material softer than the driving head, permanently fixed to the shank, positioned about it and beneath the driving head, the sealing head provided with a downwardly depending, tapered portion in contact with the shank, the lower surface of said downwardly depending portion being of approximately the same contour as the under surface of the nail head, the sealing head being provided with a downwardly depending, outwardly flaring, peripheral skirt portion, the latter being shorter than the first mentioned downwardly depending portion of the sealing head, the upper surface of the driving head forming the top of the nail, whereby the sealing head is shielded from hammer blows and injury to the sealing head is prevented.

ALBERT J. DENISTON, Jr.